// Patented Sept. 8, 1953

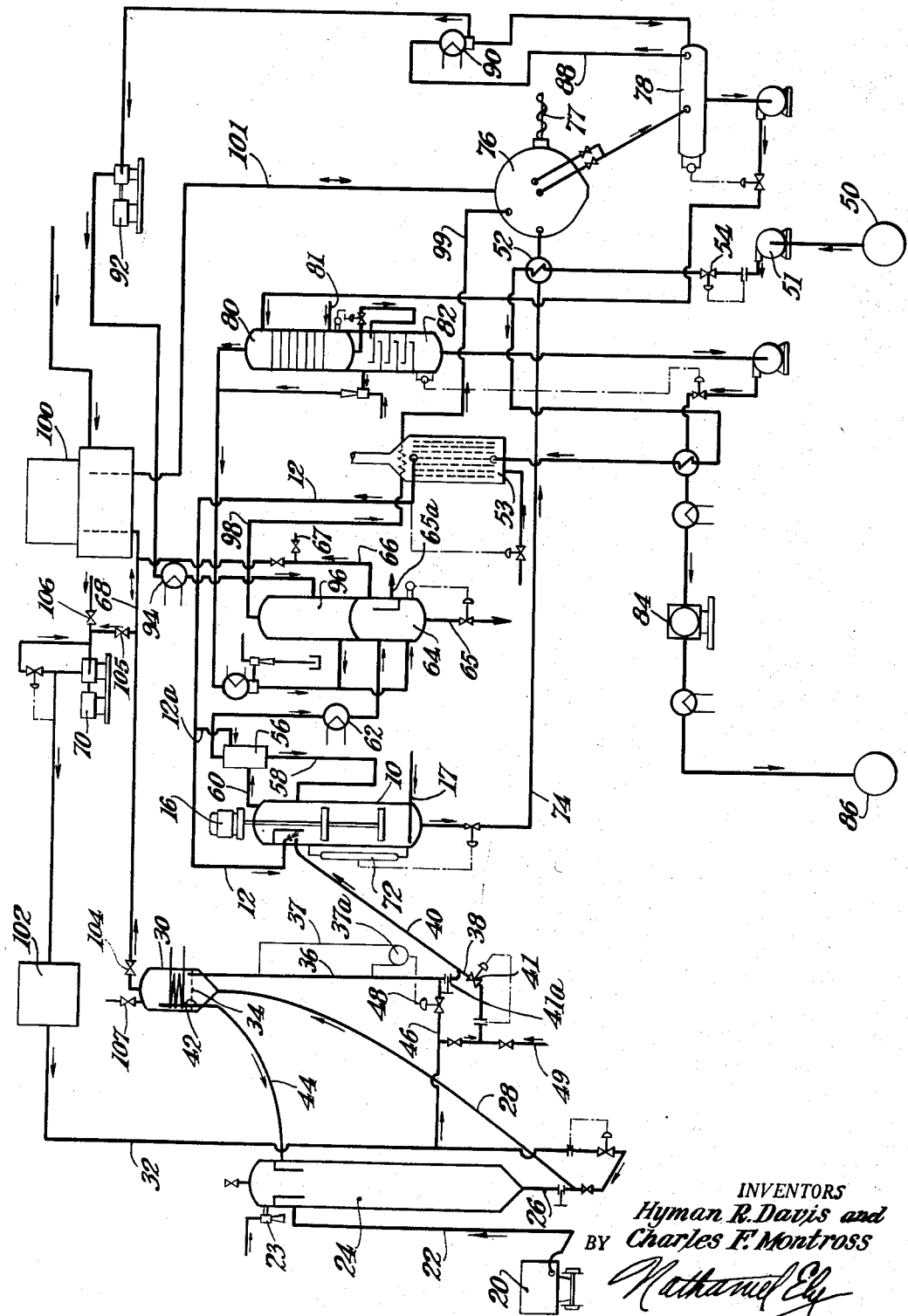

UNITED STATES PATENT OFFICE 2,651,602

PROCESS AND APPARATUS FOR CLAY CONTACTING IN THE REFINING OF LUBRICATING OIL

Hyman R. Davis, Jackson Heights, and Charles F. Montross, New York, N. Y., assignors to The Lummus Company, New York, N. Y., a corporation of Delaware Application November 4, 1948, Serial No. 58,326

6 Claims. (Cl. 196—147)

This invention relates to improvements in refining processes such as clay contacting of fatty acids, waxes, lubricating oils or similar materials for removing color bodies, unstable or malodorous components, or other contaminants, or for establishing chemical reactions.

In the refining industry various physical and chemical reactions are carried out in the presence of solid comminuted refining agents which are of natural or synthetic origin and which may depend upon the absorptive, or adsorptive or catalytic or chemical characteristics of the refining agent. For the purpose of this invention these materials are comminuted generally hard and usually abrasive particles and are brought into contact with the materials to be refined in controlled quantities and usually under temperature and pressure conditions for suitable time periods. Our invention is applicable, generally, to the handling of refining agents of this type including catalysts such as aluminum chloride, or filtering agents, as well as the specific embodiment herein disclosed which relates to clay contacting.

For the purpose of this disclosure, "clay" is used in its commercial sense to cover the various hydrous aluminum silicates as well as those related materials sold under the trade name "Super Filtrol" which appears to be a treated montmorillonite, fuller's earth, bauxite and other natural and treated solid comminuted, usually hard and abrasive materials.

Specifically referring to the clay contacting of lubricating oils, for example it is customary to mix measured quantities of clay in a slurry formed with a part of the oil and then pump the clay slurry through a metering device and then pump the slurry to a contact tank into which the main body of oil is introduced.

It has been found that slurry pumps have a very short life because of the abrasive quality of the material and other methods of handling such as bucket hoists, elevators, belt and screw conveyors, gravimetric feeds, star valves and other and similar devices, have similar operating complications. These are aggravated where precise measurement of the solid material is necessary.

The principal object of our invention is to simplify the handling and metering of solid comminuted refining materials.

A more specific object of the invention is to provide an improved and simplified clay contact plant for the purification of lubricating oil in which the clay is conveyed and metered with the aid of pneumatic means and so that the oil pumping service is entirely free of the contact material.

Further objects and advantages of the invention will appear from the following description of a preferred form of embodiment thereof taken in connection with the attached drawing which is illustrative thereof, the figure representing a schematic view of the major pieces of apparatus for a clay contacting plant.

With particular reference to the attached drawing, the plant is primarily adapted to treat lubricating oil at an intermediate stage in its production primarily for the purpose of decolorizing, neutralizing and stabilizing. The principal element in such an operation is the contact or time tank 10 to which the oil is directly charged through the line 12. The tank 10 is provided with a suitable mixer, generally indicated at 16, which may be horizontal or vertical, as desired. It may also be provided with a gas jet at 17 for introduction of air, gas, or steam as may be desired. This may be under sufficient pressure to aid agitation or fluidization.

In accordance with our present invention, the clay which is normally available in a railroad car is indicated at 20 may be removed through the line 22 by the application of a vacuum at 23 to storage bin 24. This tank is normally provided with a discharge leg 26 but in the present construction the discharge leg 26 is interconnected by a suitable transfer line 28 to a head tank, generally indicated at 30.

Gas may be introduced from line 32 to the lower part of the transfer line 28 in a manner such that the clay is put in fluidized condition and constantly discharged into the lower part of the head tank 30. Preferably a screen 34 is used across the bottom of the head tank 30 in such a manner as to establish a uniform level of a fluidized dense phase bed of contact material within the head tank 30.

In order to establish a uniform flow of clay into the contact tank 10, a clay drop leg 36, extends from a lower part of the head tank 30 but slightly above the screen 34, such drop leg having a suitable gas inlet or inlets 46 at a lower part for the purpose of maintaining a uniform and controllable density of clay within the drop leg. A differential manometer 37 will respond to changes of density of the clay mass in drop leg 36 and will establish the constant desired density through control 37a which actuates motor valve 48.

In order to establish a controllable flow of clay into the tank 10 which will not vary more than a very few percent, we find it necessary to establish a fixed head of clay in the head tank 30. This is accomplished by a variable height weir and drawoff 42 which is connected with a clay return line 44 discharging into the upper part of the clay storage bin 24.

It will thus appear that with a constant density of fluidized bed of fixed height in the tank 30, which is readily controlled by varying the height of weir 42 there will be a constant head of clay of a predetermined and uniform density in leg 36. Preferably an excess of clay is circulated to the head tank 30 from the storage bin 24 to establish the desired height of fluidized bed in 30 at all times. In one specific case, for example, we find it desirable to circulate 1500 lbs./hr. up the clay transfer line 28 to assure a supply of 1000 lbs. of clay per hour. In such case, approximately 500 lbs./hr. of clay returns to the clay storage bin 24. If desired a weir box having a dividing plate might be used instead of the draw-off weir 42.

Movement of the clay from the bottom of the drop leg 36 to the contact tank 10 is also accomplished by pneumatic means. Specifically, the gas from line 32 is introduced at 38 in a suitable jet the uniformity of flow being controlled by the gas flow controller 41. A variable orifice valve 41a may also be used. It will be appreciated with a constant head of material in the leg 36 a precisely controlled amount of contact material will be continuously discharged into the contact tank 10. If desired, steam from line 49 may be introduced to the line 40, either alternatively or in addition to the gas from line 32.

Uniform rate of clay flow is not only necessary to uniformly supply a metered amount of clay for a particular charge oil but it is necessary to be able to change the proportion of clay when a different charge oil is admitted. For example, when a heavy oil is to be treated it requires approximately 8 to 15 lbs. of clay for 300 lbs. of oil whereas with a spindle oil the usual proportions are 2 to 8 lbs. of clay per 300 lbs. of oil. With the foregoing arrangement the clay supply is continuous and automatic as well as proportioned or metered, and no slurry pumps and weighing devices are necessary.

The charge oil is fed from a charge oil reservoir 50 by a suitable pump 51 the rate of flow being controlled by the recording flow controller 54. It is then passed through one or more heat exchangers 52 and may then be heated by fired heater 53 from which it discharges through line 12 to the contact tank 10. If desired, a part of the charge oil may be diverted through line 12a into a supplementary gas scrubber 56 for washing any fines from the discharged vapors vented from tank 10. The clay fines are caught in the oil and the total effluent from such a gas scrubber is gravitated through line 58 back to the upper part of the contact tank 10.

The vapors in line 60 from the upper part of the contact tank, which consist of hydrocarbon vapors, steam, and some incondensible gas, are passed through the gas scrubber 56, thence passed through the condenser-cooler 62 and thence into the receiver and separator drum 64. The oil and water are individually withdrawn at 65 and 65a, respectively, and the gas recirculated through line 66 back to the gas line 68 leading to the compressor 70. Tank 64 may be provided with a vent 67, if desired.

The clay contact tank 10 is provided with a suitable liquid level controller 72 which can be adjusted so as to vary the soaking time of the clay oil slurry in the range of from 5 to 60 minutes. Preferably the clay contact tank 10 is located in an elevated position so that the bottoms discharge through the line 74 may be by gravity to the continuous filter 76.

The filter discharges the contaminated clay at 77 and the oil passes to a filtrate tank 78. The oil is then pumped to a sweentening tower 80 to which steam is admitted at 81 and thence to dry vacuum brightening tower 82. From the brightening tower 82 the oil is pumped through heat exchangers and the polishing filter 84 to finished oil storage generally indicated at 86. In each case, the oil pumping service is on clean oil.

Inert gas from the filtrate tank 78 is passed through the line 88 to the cooler 90 with liquid condensate returned to the tank 78. The gas then goes to the vacuum pump 92, through a knockout cooler 94, thence to drip drum 96 and thence through the line 98, through coils in the furnace 53 and thence by line 99 back to the filter 76. The filter is balanced against the gas holder indicated at 100 by line 101, such gas holder acting as a source of gas and as an emergency relief valve for the filter.

Although the foregoing arrangement of apparatus is shown schematically and in many cases the details of construction are omitted, it will be apparent that the gas used in line 32 for clay transfer which comes from the gas holder 100 and is compressed at 70 as to a pressure of 50 lbs. p. s. i. g. and may be dried by the gas dryer 102, is gas necessary for the operation of the filter 76 whether fluidization is employed or not. The excess utilities required to raise it to a desired pressure are relatively small. Alternately it may be desired to employ compressed air to effect the flow of clay from the storage bin 24 to the heads tank 30. This may be done by first closing valves 104 and 105 and then opening valves 106 and 107.

Specifically, this system eliminates two clay slurry pumps, two furnace charge pumps pumping a clay-oil mixture, two seal oil pumps in the seal oil system, a slurry tank and agitator, and a continuous weighing machine and a feed bin from a typical clay contact unit. In the present system, all pumps operate solely on clean lubricating oil, thus eliminating most all maintenance problems.

The principal feature of the invention is the great simplicity that exists in the uniform discharge of contact material into the contact tank 10. It is believed that it constitutes a fundamentally new concept in the handling of hard abrasive material for contact purposes it being understood, of course, that such process is applicable whether lubricating oil is to be clarified and decolorized or whether waxes are to be finished or whether other liquids or compounds are to be adsorbed, absorbed or catalytically or chemically treated.

While we have shown and described a preferred form of embodiment of the invention, we are aware that modifications may be made thereto and we therefore desire a broad interpretation of the invention within the scope and spirit of the description herein and of the claims appended hereinafter.

We claim:

1. In the process of continuously refining lubricating oil by contacting with clay wherein quantities of clay precisely measured with respect to the oil are delivered to a contact tank at controllable rates, the improvement which comprises transferring the clay from an initial storage bin to the contact tank in separate steps, the first of which consists in pneumatically removing an excess of clay not to exceed 150% of that required for the contacting operation to an intermediate elevated chamber, maintaining a predetermined clay level in said elevated chamber independent of the amount drawn off from the chamber, returning all clay above the predetermined level in said chamber to the storage bin, drawing off clay from said chamber through a substantially vertical conduit, aerating the clay in said conduit to establish a predetermined density therein, applying a gaseous medium to the lower end of said conduit to discharge clay therefrom and, through a connecting conduit into the contact tank, controlling the application of said gaseous medium by differential of pressure to maintain a uniform rate of flow, separately introducing clay free oil to the contact tank, and varying the discharge rate of the aerated clay into the connecting conduit in accordance with the refining treatment requirements of the oil introduced to the contact tank.

2. The process of continuously contacting clay as claimed in claim 1 in which the gaseous medium is separated from the clay in the contacting unit and is recompressed and used for the various gas conveying purposes.

3. A process of continuously contacting clay as claimed in claim 1 in which the gaseous medium introduced into the second conduit is steam and the vapors removed from the contacting unit are condensed.

4. A process of continuously contacting clay as claimed in claim 1 in which the gas utilized for transfer of refining agent is air.

5. The process of continuously contacting clay as claimed in claim 2 in which the gaseous medium and clay entering the contacting unit is scrubbed with the oil to remove fines therefrom.

6. A fluidized clay contact unit for lubricating oil treating, comprising a clay storage bin, means to apply a vacuum thereto to feed clay to said bin, an elevated clay heads tank, a contact tank, a clay transfer line from the lower part of the clay storage bin to the lower part of the heads tank, a variable level control in said heads tank to establish a uniform fixed level therein, an excess clay drawoff conduit from said heads tank, a clay drop leg extending from the lower part of said heads tank to said contact tank and having a vertical portion, means to fluidize the vertical portion of the drop leg to establish a predetermined density of fluidized material therein, control means connected to the vertical portion of the drop leg to maintain the clay in said vertical portion of the drop leg at a uniform density, a variable orifice control mechanism to vary the rate of clay flow from the drop leg, separate gas introduction means to discharge clay from the lower part of said vertical portion of the drop leg to the contact tank, and a flow controller to maintain a constant rate of flow of the separately introduced gas whereby the rate of clay flow is proportional to the action of said separate gas introduction means.

HYMAN R. DAVIS.
CHARLES F. MONTROSS.

References Cited in the file of this patent

UNITED STATES PATENTS

| Number | Name | Date |
| --- | --- | --- |
| 1,616,547 | Pontoppidan | Feb. 8, 1927 |
| 2,326,294 | Gee | Aug. 10, 1943 |
| 2,329,930 | Nebeck | Sept. 21, 1943 |
| 2,366,372 | Voorhees | Jan. 2, 1945 |
| 2,373,008 | Becker | Apr. 3, 1945 |
| 2,420,761 | Thomas | May 20, 1947 |
| 2,436,340 | Upham | Feb. 17, 1948 |
| 2,436,464 | Van Dornick | Feb. 24, 1948 |
| 2,449,027 | Voorhees | Sept. 7, 1948 |
| 2,451,803 | Campbell et al. | Oct. 19, 1948 |
| 2,456,035 | Wobker | Dec. 14, 1948 |
| 2,467,149 | Munday | Apr. 12, 1949 |
| 2,472,459 | Banks | June 7, 1949 |
| 2,477,042 | Burnside | July 26, 1949 |